April 29, 1958  D. H. BELDEN  2,832,812
ISOPARAFFIN ALKYLATION PROCESS
Filed April 20, 1953
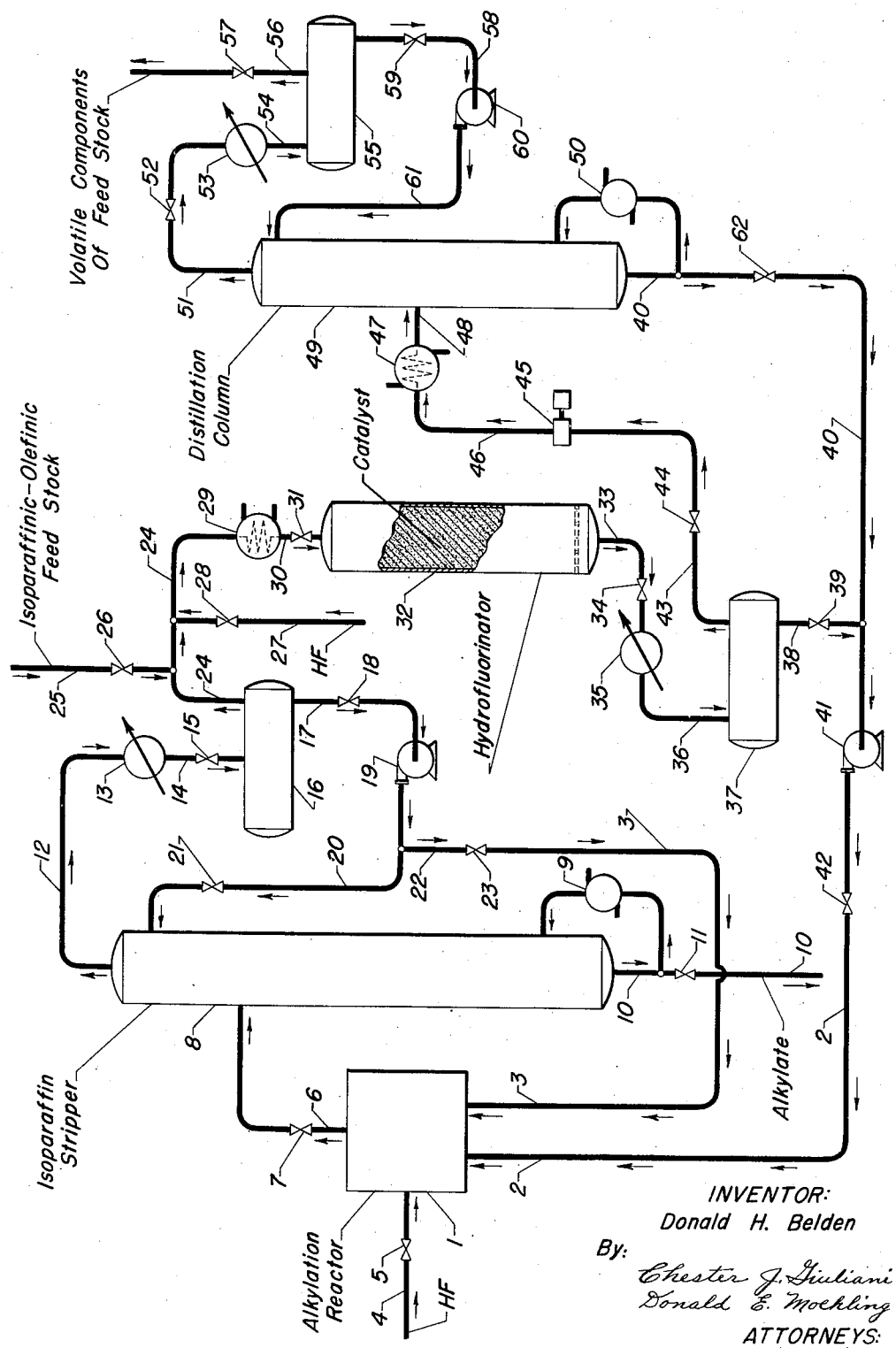
INVENTOR:
Donald H. Belden
By:
Chester J. Giuliani
Donald E. Moehling
ATTORNEYS:

United States Patent Office 2,832,812
Patented Apr. 29, 1958

2,832,812

ISOPARAFFIN ALKYLATION PROCESS

Donald H. Belden, North Riverside, Ill., assignor to Universal Oil Products Company, Des Plaines, Ill., a corporation of Delaware Application April 20, 1953, Serial No. 349,758

16 Claims. (Cl. 260—683.42)

This invention relates to an improvement in the process for alkylating isoparaffinic hydrocarbons with mono-olefins in the presence of hydrofluoric acid alkylation catalyst under conditions whereby an improved alkylate product, insofar as anti-knock properties is concerned, and improved operation of the process insofar as more economical recovery of certain components of the reaction mixture and of the volatile hydrogen fluoride catalyst from the alkylate product is concerned. More specifically, the invention concerns mixing the olefinic hydrocarbon portion of the feed stock with the recovered light isoparaffin overhead distillate recovered by fractional distillation of the alkylation reaction product, forming of alkyl fluorides by the reaction of the olefinic portion of the feed stock with the hydrogen fluoride contained in said light overhead fraction.

It is one object of the invention to provide a convenient and practical means for recovery of the normally small amount of hydrogen fluoride contained in the light overhead distillate produced in the distillation of the hydrocarbon product of a hydrogen fluoride catalyzed isoparaffin-olefin alkylation reaction. Another object of the invention is to provide a means for the production of secondary alkyl fluorides from the olefinic hydrocarbon portion of the feed stock in a hydrogen fluoride catalyzed isoparaffin-olefin alkylation reaction. Still another object of the invention is to reduce the volatility of the light olefins relative to the light paraffins contained in the hydrocarbon feed stock to a hydrogen fluoride catalyzed isoparaffin-olefin alkylation reaction and thereby simplify the recovery and removal of such light paraffin components from the hydrocarbon feed without the inclusion of hydrogen fluoride vapors therein.

In one of its embodiments the present invention relates to an improvement in the process for alkylating an isoparaffinic hydrocarbon with an olefinic hydrocarbon alkylating agent in the presence of a hydrogen fluoride alkylation catalyst, utilizing a molar ratio of isoparaffinic hydrocarbon to olefinic hydrocarbons in the alkylation reaction mixture greater than one, said improvement comprising distilling from the predominantly hydrocarbon portion of the resulting alkylation reaction mixture a light overhead fraction comprising hydrogen fluoride and hydrocarbons in said mixture boiling below said isoparaffinic hydrocarbon, contacting at least a portion of said light overhead fraction with the olefinic feed stock containing said olefinic hydrocarobn alkylating agent at reaction conditions sufficient to convert the hydrogen fluoride in said overhead fraction and said olefinic hydrocarbon to the corresponding alkyl fluoride and thereafter distilling the resulting reaction product to separate substantially hydrogen fluoride free paraffinic and fluorinated hydrocarbon components therefrom more volatile than said isoparaffinic hydrocarbon.

A more specific embodiment of the present invention concerns an improvement in the process for alkylating isobutane with butylene in the presence of substantially anhydrous hydrogen fluoride, utilizing a molar ratio of isobutane to butylene of from about 3 to 1 to about 20 to 1 and a $C_4$ olefinic feed stock containing $C_3$ hydrocarbons, the improvement of said process which comprises distilling a light vapor overhead from the predominantly hydrocarbon portion of the product of said alkylation reaction, comprising components thereof boiling below n-butane, condensing a major proportion of the isobutane from said vapor overhead, segregating a non-condensed, hydrogen fluoride-containing vapor from said overhead, mixing said $C_4$ olefinic feed stock with said non-condensed vaopr, passing the resulting mixture in contact with a catalyst which promotes hydrofluorination of the olefins of said feed stock with the hydrogen fluoride of said noncondensed vapor to form thereby sec-butylfluoride from the 1-butene component of said feed stock and separating a $C_3$ fraction from the product of said hydrofluorination free of hydrogen fluoride.

In the commercial process for the production of high octane motor and aviation fuels by the hydrogen fluoride catalyzed alkylation of isoparaffinic hydrocarbons with olefinic hydrocarbons, the olefinic feed stocks available in large quantities from commercial sources of supply, such as certain petroleum fractions and hydrocarbon distillates recovered from petroleum conversion products, are usually contaminated with lower boiling hydrocarbon components which accompany the olefins desired as alkylating agents in the distillation of such stocks, from broader boiling range fractions. Thus, in the alkylation of isobutane with butylene to form aviation alkylate comprising knock-resistant branched chain, gasoline boiling range hydrocarbons, the commonly utilized sources of such reactants is the light, normally gaseous portion of the products of certain petroleum conversion processes. A typical source of such feed stocks, for example, is the light gas produced by a thermal or a catalytic cracking process, the gases being separated by fractional distillation of the vapor overhead portion of the cracked product. The $C_4$ distillate contains various proportions of propane, propylene, n-butane, isobutane, a mixture of butylene isomers and usually minor amounts of $C_5$ hydrocarbons. Separation of these mixed hydrocarbons into a single fraction consisting only of $C_4$ components without contamination with $C_3$ and/or $C_5$ hydrocarbons cannot generally be readily effected on a commercial basis by means of fractional distillation because of the tendency of such hydrocarbon mixtures comprising a variety of isomeric and homologous components varying in molecular weights only by relatively small differentials, to boil over a wide range of temperatures without distinct boundaries in the compositions and boiling points of the fractions distilled. Thus, an attempt to segregate only the $C_4$ components from the mixture is thwarted by the inclusion of $C_3$ and $C_5$ components in the distillate. Consequently the commercial feed stock available for isobutane alkylation with butylenes are generally contaminated by the presence of a considerable portion of $C_3$ hydrocarbons, although made up predominantly of $C_4$ components. The presence of the $C_3$ components in the hydrocarbon product of an isobutane alkylation process, for example, necessitates the inclusion of a depropanizer fractional distillation column in the flow scheme for such alkylation processes in order to provide a gasoline of the required volatility for motor fuel use and to provide a means for eliminating $C_3$ from the system, since the adjacent boiling hydrocarbon, isobutane is recycled within the system to extinction. In alkylation processes catalyzed by hydrogen fluoride the latter reagent accompanies the $C_3$ fraction distilled from the alkylate product, unless the alkylate product is treated in a preliminary chemical treatment to remove the hydrogen fluoride therefrom, generally an uneconomical and otherwise undesirable method for removal of hydrogen fluoride from such hydrocarbon fractions. The present invention, applicable to hydrogen fluoride catalyzed alkylation reactions, provides a convenient means for converting the hydrogen fluoride normally present in the light overhead distilled from the hydrocarbon portion of the alkylation reaction mixture into alkyl fluorides corresponding to the olefin utilized as alkylating agent, thereby providing a feasible method for removing the $C_3$ components from the alkylate product without contamination by inclusion of hydrogen fluoride therein. The present method comprises contacting the light overhead from the alkylate distillation with the olefinic feed stock to the process which contains the $C_3$ contaminants and thereafter converting the olefins contained in such feed stock to alkyl fluorides less volatile than the $C_3$ components, making the separation of the latter $C_3$ hydrocarbons by distillation readily feasible. The method also results in an incidental improvement of the alkylate product of the process by converting the 1-butene component of the olefinic feed stock to sec-butyl fluoride which undergoes condensation during the alkylation with isobutane to form a higher quality, more highly branched-chain $C_8$ hydrocarbon alkylate product having greater anti-knock properties when utilized as motor fuel than the corresponding product formed by the direct alkylation of isobutane with 1-butene.

It is to be emphasized that although the present process is particularly applicable to the alkylation of isobutane with a butylene containing olefinic feed stock, the process is also applicable to other isoparaffinic and other olefinic hydrocarbon feed stocks to produce motor fuel or aviation alkylates or higher boiling aliphatic hydrocarbon products. Thus, other isoparaffinic hydrocarbons such as isopentane, one or more of the isohexanes, or mixtures of the aforementioned isoparaffins, branched-chain heptanes and other aliphatic hydrocarbons of branched-chain structure may be utilized as feed stock. Similarly, the amylenes, hexenes, heptenes and higher molecular weight olefinic hydrocarbons may be utilized as the olefinic hydrocarbon alkylating agent in the process. The general principles and reasons which underlie the present process flow utilized in the invention, that is, the inclusion of olefins and paraffins of lower molecular weight than desired in hydrocarbon feed stocks to isoparaffin alkylation reactions and the tendency of hydrogen fluoride to distill with the lowest molecular weight components of the alkylation product, generally the lower hydrocarbon homologs present in the feed stock, including hydrocarbons of considerably higher boiling points than hydrogen fluoride, introduces the problem of contamination of the light overhead fractions distilled from the hydrocarbon portion of the alkylation product with hydrogen fluoride, loss of valuable hydrogen fluoride from the system if not recovered, and provision for additional equipment for washing such streams, etc.

In specifying that hydrogen fluoride is utilized as alkylation catalyst for promoting the condensation of the isoparaffinic and olefinic hydrocarbon feed stocks, it is intended that such designation include not only the substantially anhydrous liquid hydrogen fluoride, generally preferred for catalyzing the alkylation reaction, but also includes hydrofluoric acid containing not more than about 10%, and preferably not more than about 5% by weight of water, as well as boron trifluoride-hydrogen fluoride mixtures which are also utilizable as alkylation catalysts.

The present invention is further described and illustrated in the accompanying drawing which embodies several alternative procedures for operating the process. Referring to the accompanying diagram, alkylation reactor 1 is charged with an isoparaffinic hydrocarbon containing stream, preferably a stream consisting predominantly of isobutane, through line 2 from sources hereinafter more fully described. A portion of the isoparaffin charged into reactor 1 may comprise a recycled isoparaffin stream separated from the overhead distillate recovered by fractional distillation of the hydrocarbon portion of the alkylation reaction product, said isoparaffin being introduced into reactor 1 through line 3. Line 2 also carries the alkylating agent in the present process in the form of an olefinic hydrocarbon or its corresponding alkyl fluoride formed in the subsequent stages of the process by reaction of the olefinic feed stock with hydrogen fluoride, as provided herein. The alkylation reaction is conducted in the presence of a hydrogen fluoride-containing catalyst introduced into reactor 1 through line 4 in controlled amounts, as determined by valve 5, generally in an amount sufficient to provide a catalyst to hydrocarbon volume ratio in the alkylation reactor of from about 0.5 to about 2.5. In order to reduce the tendency of the olefinic portion of the feed stock to undergo polymerization prior to alkylation in reactor 1, the molar proportion of isoparaffins to olefinic hydrocarbons in the alkylation reactor is desirably maintained at a value greater than 1, up to about 30 to 1 and preferably from about 3 to 1 to about 20 to 1. The alkylation reaction occurs at temperatures in reactor 1 of from about 0° to about 200° F. and preferably from about 30° to to about 100° F. The predominantly hydrocarbon alkylate product containing an excess of the isoparaffinic hydrocarbon reactant and an appreciable quantity of hydrogen fluoride catalyst which normally dissolves in the hydrocarbons present in the alkylation reaction mixture is withdrawn from reactor 1 or from a catalyst settling zone in which the total alkylation reaction mixture is allowed to separate into a used catalyst phase and the alkylate product phase (not illustrated on the accompanying drawing) through line 6 and valve 7 and discharged therefrom into isoparaffin stripper 8, comprising a distillation column from which the light components, including the excess isoparaffinic hydrocarbon and a major proportion of the dissolved and/or entrained hydrogen fluoride catalyst is vaporized from the alkylate product. The heat required for distillation purposes is supplied from reboiler 9 through which the higher boiling alkylate bottoms are circulated and heated from a source of external heat. The stripped alkylate product from which the excess isoparaffin feed stock has been largely removed is withdrawn as fractionater bottoms, from the lower portion of stripping column 8 through line 10 and valve 11 and discharged from the process into storage, further fractionation, blending, or additional treatment, as desired. The light vapor overhead distilled from the hydrocarbon portion of the alkylation reaction mixture, comprising colatilized hydrogen fluoride, isoparaffin and lower boiling components of the feed stock is withdrawn from stripping column 8 through line 12, cooled by passage through condenser 13 which liquefies at least a portion of the isoparaffin component of the light vapor overhead and thereafter flows from condenser 13 through line 14 and valve 15 into vapor overhead receiver 16 wherein the liquefied isoparaffin is separated from the remaining, non-condensed portion of the light vapor overhead. The liquid layer of condensed isoparaffin may contain a major proportion of the volatilized hydrogen fluoride originally dissolved and/or entrained in the hydrocarbon portion of the alkylation reaction mixture or it may contain only a minor proportion of hydrogen fluoride, depending upon the boiling point of the hydrocarbon feed stocks utilized in the present alkylation process. The liquefied isoparaffin is withdrawn from receiver vessel 16 through line 17 and valve 18 and transferred by means of pump 19 into line 20. In the preferred method of operating isoparaffin stripper column 8, at least a portion of the condensed isoparaffin removed from receiver vessel 16 is recycled through valve 21 into the upper portion of stripping column 8 to act as reflux therein and provide efficient distillation of the light vapor overhead from the higher boiling n-paraffin components of the feed stock and from the alkylate hydrocarbons present in the stripping column feed. A portion of the isoparaffin condensate in line 20 is desirably recycled directly to the alkylation reactor to make up the desired isoparaffin to olefin ratio present in the latter reactor. The diversion of such portion of the isoparaffin into that alkylation reactor also reduces the volume of hydrocarbon stock to be treated in the subsequent stages of the present process without detracting from the results to be obtained by means of the process. For this purpose, the isoparaffin condensate is withdrawn from line 20 through line 22 and valve 23 for discharge into isoparaffin recycle line 3 which transfers the isoparaffin directly into alkylation reactor 1.

The non-condensed portion of the light vapor overhead from stripping column 8 collected in receiver vessel 16, comprising predominantly hydrocarbons boiling below the isoparaffin component of the light vapor overhead, which in the case of utilizing a $C_4$ fraction as feed stock in the present process is largely propane containing non-condensed hydrogen fluoride vapor which normally accompanies the low boiling hydrocarbons in appreciable proportions, is removed from receiver vessel 16 through line 24 for transfer therefrom to subsequent stages of the process. In accordance with the operation of the present process, the mixture of volatilized hydrocarbons and hydrogen fluoride recovered by distillation from the alkylation reaction mixture is mixed with the olefinic feed stock charged to the process in order to convert the olefinic hydrocarbons into alkyl fluorides by reactions of the olefins present in the feed stock with the hydrogen fluoride contained in the light overhead vapors. For this purpose the olefinic feed stock, which may also contain the isoparaffin equivalent of that portion of the isoparaffins consumed in the alkylation reaction to produce alkylation products is introduced into line 24 through line 25 in amount controlled by valve 26, the feed stock mixing with the light hydrocarbons and hydrogen fluoride in the vapor overhead in line 24 as the resulting mixture flows therethrough. In the preferred embodiment of the present process for the alkylation of isobutane with $C_4$ olefins, the feed stock introduced through line 25 is generally a mixture of $C_4$ paraffins and olefins, such as n-butane, isobutane, 1-butene, 2-butene, isobutylene, as well as minor amounts of propylene, propane and $C_5$ hydrocarbons normally present in a predominantly $C_4$ hydrocarbon fraction recovered from a commercial source. Since the predominant product formed by reacting an olefinic hydrocarbon with hydrogen fluoride is a secondary alkyl fluoride, generally considered a better alkylating agent than a normal or 1-olefin containing a corresponding number of carbon atoms, because of the more highly branched-chain structure of the alkylate produced therefrom, additional hydrogen fluoride in an amount sufficient to convert substantially all of the olefins contained in the olefinic feed stock to secondary alkyl fluorides may be introduced into line 24 through line 27, the amount thereof being controlled by valve 28. The introduction of additional hydrogen fluoride is particularly advantageous when the amount of hydrogen fluoride contained in the light vapor overhead is less than a stoichiometric quantity for complete conversion of the olefins to alkyl fluorides. The resulting mixture, comprising hydrogen fluoride, olefinic hydrocarbons, and paraffinic hydrocarbon, including isoparaffins, if the latter are present in the olefinic feed stock, are conveyed through line 24 and through heater 29 which raises the temperature of the mixture to a value of from about 30° to about 250° F. and preferably from about 150° to about 250° F., the temperature and pressure factors being mutually adjusted to form a stream in which the components are substantially completely in vapor phase. The resulting vapors are withdrawn from heater 29 through line 30, valve 31 and introduced into hydrofluorinating reactor 32 which desirably contains a solid contacting material or hydrofluorination catalyst which promotes the conversion of the olefins and hydrogen fluoride contained in the latter stream into alkyl fluorides and particularly promotes the conversion of the 1-olefin components into secondary alkyl fluorides. Suitable contacting agents for the latter conversion are such solid materials as hydrogen fluoride resistant metals, including aluminum, copper, chromium, nickel, cobalt etc. Elemental carbon, preferably in particle form, and such catalysts as solid metal fluoride salts, including calcium fluoride, strontium fluoride, barium fluoride, sodium fluoride, potassium fluoride, aluminum fluoride, etc. At the indicated hydrofluorination reaction temperature and in the presence of the aforementioned contacting materials, the olefins present in the feed stock charged into line 24 and the hydrogen fluoride present at least in the light vapor overhead react in vapor phase to form predominantly secondary alkyl fluorides. The quantity of hydrogen fluorides charged into the hydrofluorination reactor is limited to a quantity not greater than the stoichiometric quantity required to completely convert all of the olefins present in the feed stock charged into reactor 32 into alkyl fluorides, the effluent product removed from hydrofluorinator 32 through line 33 and valve 34 containing substantially no free hydrogen fluoride which would otherwise corrode subsequent processing equipment unless the latter is fabricated from HF-resistant alloys. The vapors removed from reactor 32 are cooled in heat exchanger 35 to a temperature at which a substantial proportion of the $C_4$ components thereof, including the isoparaffins and alkyl fluorides, are condensed to liquids at the operating pressure maintained within cooler 35. In the case of utilizing the aforementioned preferred $C_4$ feed stocks in the process, the vapor effluent of reactor 32 is cooled to a temperature sufficient to liquefy only the $C_4$ components of the stream, permitting the $C_3$ and lighter hydrocarbons and alkyl fluorides to remain in vapor state. The cooled effluent is withdrawn from heat exchanger 35 through line 36 into receiver vessel 37 wherein the liquefied portion of the hydrofluorination effluent is permitted to accumulate and separate from the vapor portion of the stream. The liquefied isoparaffins, normal paraffins, and alkyl fluorides formed by reaction of hydrogen fluoride with the olefinic alkylating agent is removed from receiver 37 through line 38 and valve 39 and discharged into line 40 from which it is transferred by means of pump 41 into line 2 through valve 42 into alkylation reactor 1 for conversion of the secondary alkyl fluorides, isoparaffins and remaining unfluorinated olefins, if any, into the desired alkylate product of this invention.

The non-condensed vapor portion of the hydrofluorination reactor effluent accumulating in receiver vessel 37 is transferred in vapor phase therefrom through line 43 and valve 44, and compressed sufficiently in compressor 45 to liquefy the light hydrocarbons and alkyl fluoride components of this stream which boil at temperatures below the isoparaffin desired for alkylation. In lieu of sufficient compression to liquefy the hydrocarbons and alkyl fluorides in this stream, the latter may be cooled to the liquefaction point by transfer through line 46 into cooler 47 wherein the temperature is reduced sufficiently to produce a liquid stream, the latter being withdrawn therefrom through line 48 and charged into distillation or fractionating column 49. Sufficient heat is supplied to the liquefied fractionator charge in reboiler 50 to vaporize the volatile, undesired components of the hydrocarbon feed stock such as propane, ethane, etc. The latter are withdrawn as a light overhead from column 49 through line 51, and valve 52, in vapor form. The overhead generally contains uncondensed, unfractionated isobutane present in the feed to column 49 which is desirably recovered for recycling purposes in the process. The separation may generally be effected by partially condensing the vapor overhead from column 49. including a portion of the propane etc. in the overhead, the overhead being cooled in condenser 53, withdrawn therefrom through line 54 and discharged into receiver 55. The undesired light vapors, such as propane, ethane etc., are removed as light gas through line 56 and valve 57 for discharge from the process. A condensed liquid portion of the vapor overhead, comprising isobutane, is removed as liquid from receiver 55 through line 58 and valve 59 and is recycled as liquid reflux by means of pump 60 through line 61 into the upper portion of column 49.

The liquid residue of the charge stock to fractionator 49, comprising isoparaffin and alkyl fluorides corresponding to the desired alkylating agent is withdrawn as a liquid distillation bottoms through line 40 in amounts controlled by valve 62 and transferred by means of pump 41 to line 2 as a portion of the liquid feed stock to the alkylation reaction.

The alkylate product formed by alkylation of the isoparaffinic charged stock with the olefinic or alkyl fluoride alkylating agent is a mixture of highly branched-chain paraffinic hydrocarbons of particularly high anti-knock value formed by virtue of the selective conversion of the normal or 1-olefin components of the hydrocarbon feed stock into secondary alkyl fluorides during the hydrofluorination reaction stage of the process. Another desirable result obtained by virtue of the above conversion is the discharge of a hydrogen fluoride-free fraction from distillation column 49, representing the volatile hydrocarbon components of the olefinic feed stock, thereby eliminating the necessity for utilizing expensive stainless steel and other acid-resistant alloys and metals in the fabrication of pumps, receiving vessels, distillation columns, and piping in that portion of the equipment required for separation of the volatile components of the feed stock in the process flow.

The present invention will be further described and illustrated in the following example which, however, is not intended to limit the generally broad scope of the invention in strict accordance therewith.

*Example I*

A predominantly $C_4$ hydrocarbon fraction having the following composition is subjected to alkylation in the presence of 99% liquid hydrogen fluoride catalyst in a stirred pressure autoclave reactor operated at a temperature of 50° C. and at a pressure of about 200 lbs./in.$^2$:

| Composition of feed: | Weight percent |
|---|---|
| Propane-propylene | 1.4 |
| Isobutylene | 6.2 |
| Butene-1 | 4.6 |
| Butene-2 | 4.5 |
| Isobutane | 72.0 |
| n-Butane | 10.5 |
| $C_5$ | 0.8 |

The above hydrocarbon fraction is admitted into the process flow by mixing it with a vapor overhead fraction from an isobutane stripping column, hereinafter more fully described. The light vapor overhead is a mixture of hydrogen fluoride and hydrocarbons containing 2.7% by weight of hydrogen fluoride, 2.1% by weight of $C_3$, 23.3% by weight of n-butane, and 71.9% isobutane. The resulting mixture made up by mixing 2 volume proportions of the olefinic feed with 3.5 volumes of the vapor overhead, thereby providing a total isobutane to butylene ratio of approximately 10/1 and a HF to butylene ratio of about 0.9/1 was heated to a temperature of 120° F. and passed through an elongated stainless steel tube at a pressure of 175 lbs./in.$^2$, the tube containing pellets of pilled calcium fluoride packed in the tube with free space between the pellets to permit passage of the mixed gasses through the reactor. A small sample of the product liquefied and subjected to analysis indicates that substantially all of the original olefins have been converted to alkyl fluorides and the mixture contains substantially no free hydrogen fluoride. The butyl fluorides present in the mixture are 93 wt. percent secbutyl fluorides. The resulting mixture in liquid form was cooled to 50° F. and mixed with 0.5 of its volume of liquid anhydrous hydrogen fluoride at a pressure of 250 lbs./in.$^2$ in a rotating turbomixer reactor having a stainless steel liner. The mixture was reacted at 50° F. and at a pressure of 250 lbs./in.$^2$ for 30 minutes and thereafter discharged into a settling vessel for the separation of a lower liquid phase of hydrogen fluoride sludge from an upper, substantially hydrocarbon phase containing a small amount (0.95% by weight) of dissolved hydrogen fluoride. Distillation of the upper, substantially hydrocarbon phase under pressure in a stainless steel column produced an overhead vapor which was reserved for further fractionation and a higher boiling bottoms residue comprising alkylate and a small percentage of the isobutane and n-butane introduced into the process with the feed stock. The overhead vapor was compressed to 250 lbs./in.$^2$ and cooled to 20° F., causing the vapors to liquefy into a condensed fraction which was charged into a fractionating column and distilled. A reboiler in the lower portion of the column supplied sufficient heat to vaporize the $C_3$ and $C_2$ components of the liquid feed stock, the latter being taken overhead from the column in a hydrogen fluoride-free condition. The liquid bottoms of the latter distillation were removed and utilized in the foregoing process as the light vapor overhead which is mixed with the incoming feed stock to the process.

The liquid bottoms of the primary alkylate after further fractionation to separate a gasoline boiling range fraction (B. P. up to 400° F.) and mixing with 3 cc. of T. E. L. (tetraethyl lead) per gallon had a research motor octane number of 96.5.

An alkylation run similar to the above was made, except that the olefinic feed stock, comprising mixed $C_4$ olefins, was mixed directly with an isobutane-n-butane mixture to provide a mixture containing an isobutane to butylene ratio of 10 to 1. The hydrocarbon mixture, without prior hydrofluorination of the olefinic feed stock, when reacted in the presence of 0.5 of its volume of liquid anhydrous hydrogen fluoride yielded an alkylate gasoline fraction having a research method octane number (3 cc. T. E. L.) of 93.6.

I claim as my invention:

1. An improvement in the process for alkylating an isoparaffinic hydrocarbon with an olefinic hydrocarbon alkylating agent in the presence of a hydrogen fluoride alkylation catalyst utilizing a molar ratio of isoparaffinic to olefinic hydrocarbon in the alkylation reaction mixture greater than 1, said improvement comprising distilling from the predominantly hydrocarbon portion of said alkylation reaction mixture a light overhead fraction comprising hydrogen fluoride and hydrocarbons in said reaction mixture boiling below the said isoparaffinic hydrocarbon, contacting at least a portion of said light overhead fraction with the olefinic feed stock containing said olefinic hydrocarbon alkylating agent at a temperature of from about 150° to about 250° F. in the presence of a solid contact material to convert the hydrogen fluoride in said overhead fraction and said olefinic hydrocarbon to the corresponding alkyl fluoride, and thereafter fractionating the resulting reaction product to separate substantially hydrogen fluoride free paraffinic and fluorinated hydrocarbon components therefrom more volatile than said isoparaffinic hydrocarbon.

2. The process of claim 1 further characterized in that said isoparaffinic hydrocarbon is isobutane.

3. The process of claim 1 further characterized in that said olefinic feed stock comprises a mixture of $C_4$ olefinic hydrocarbons.

4. The process of claim 1 further characterized in that said isoparaffinic hydrocarbon and said olefinic hydrocarbon feed stock comprise a mixture of $C_4$ olefinic and isoparaffinic hydrocarbons.

5. The process of claim 1 further characterized in that said molar ratio of isoparaffinic to olefinic hydrocarbons is from about 3 to 1 to about 20 to 1.

6. The process of claim 1 further characterized in that a major proportion of the isoparaffinic hydrocarbon component of the alkylation reaction mixture is separated from said light vapor overhead and recycled to the alkylation reaction mixture.

7. The process of claim 1 further characterized in that said solid contact material comprises a hydrofluorination catalyst.

8. The process of claim 7 further characterized in that said hydrofluorination catalyst is a solid metallic fluoride salt.

9. The process of claim 8 further characterized in that said metallic fluoride salt is calcium fluoride.

10. The process of claim 8 further characterized in that said metallic fluoride salt is barium fluoride.

11. The process of claim 8 further characterized in that said metallic fluoride salt is aluminum fluoride.

12. The process of claim 1 further characterized in that said solid contact material comprises a hydrogen fluoride-resistant metal which promotes hydrofluorination of said olefinic feed stock.

13. The process of claim 12 further characterized in that said metal is copper.

14. An improvement in the process for alkylating isobutane with butylene in the presence of substantially anhydrous hydrogen fluoride in an alkylation reaction utilizing a molar ratio of isobutane to butylene and butyl fluorides of from about 3 to 1 to about 20 to 1 and a $C_4$ olefinic feed stock containing a $C_3$ hydrocarbon, said improvement comprising distilling a light vapor overhead from the predominantly hydrocarbon portion of the product of said alkylation reaction comprising components thereof boiling below butane, and containing a major proportion of the isobutane in said alkylation reaction product, segregating a non-condensed, hydrogen fluoride-containing vapor from said overhead, mixing said $C_4$ olefinic feed stock with said non-condensed vapor, passing the resulting mixture at a temperature of from about 150° to about 250° F. in contact with a catalyst which promotes hydrofluorination of the olefins in said feed stock with the hydrogen fluoride in said non-condensed vapor and thereby form alkyl fluorides, separating a $C_3$ component substantially free of hydrogen fluoride from the product of the resulting hydrofluorination reaction comprising a $C_4$ fraction and transferring said last mentioned $C_4$ fraction into said alkylation reaction.

15. The process of claim 14 further characterized in that the condensed isobutane recovered from said light vapor overhead is recycled to the alkylation reaction in an amount sufficient to provide a ratio of isobutane to combined $C_4$ olefins and butyl fluorides of from about 3 to 1 to about 20 to 1.

16. An improvement in the process for alkylating isobutane with butylene and butyl fluoride in the presence of substantially anhydrous hydrogen fluoride in an alkylation reaction utilizing a molar ratio of isobutane to combined butylene and butyl fluoride of from about 3 to 1 to about 20 to 1 and a $C_4$ olefinic feed stock comprising a mixture of isobutane, butene isomers, and $C_3$ hydrocarbons, said improvement comprising distilling a light vapor overhead from the predominant hydrocarbon portion of the product of said alkylation reaction comprising components thereof boiling below n-butane, condensing a major portion of the isobutane from said vapor overhead, segregating a non-condensed, hydrogen fluoride-containing vapor from said overhead, mixing said $C_4$ olefinic feed stock with said non-condensed vapor, passing the resulting mixture at a temperature of from about 150° to about 250° F. in contact with a solid material which promotes hydrofluorination of the olefins of said feed stock with the hydrogen fluoride in said non-condensed vapor and thereby form alkyl fluorides therefrom, separating a $C_3$ fraction substantially free of hydrogen fluoride from a $C_4$ fraction comprising at least one of the group consisting of a butylene, butyl fluoride and a $C_4$ paraffin hydrocarbon from the product of said hydrofluorination and transferring said last mentioned $C_4$ fraction into said alkylation reaction.

References Cited in the file of this patent

UNITED STATES PATENTS

| | | |
|---|---|---|
| 1,996,115 | Lazier | Apr. 2, 1935 |
| 2,399,368 | Matuszak | Apr. 30, 1946 |
| 2,434,000 | Matuszak | Jan. 6, 1948 |
| 2,448,601 | Kelley | Sept. 7, 1948 |
| 2,448,620 | Reading et al. | Sept. 7, 1948 |
| 2,463,076 | Zimmerman et al. | Mar. 1, 1949 |
| 2,481,207 | Eberle | Sept. 6, 1949 |
| 2,487,142 | Kelley | Nov. 8, 1949 |
| 2,542,927 | Kelley | Feb. 20, 1951 |
| 2,739,989 | Barringer et al. | Mar. 27, 1956 |